United States Patent
Bergström et al.

(10) Patent No.: US 12,325,437 B2
(45) Date of Patent: Jun. 10, 2025

(54) METHOD FOR SYNCHRONIZING A CLOCK-FREE COMPUTATIONAL NODE IN A VEHICLE, METHOD FOR PERFORMING AN ACTION AT A PRE-DEFINED TIME, FIRST COMPUTATIONAL NODE, SECOND COMPUTATIONAL NODE AND COMPUTATIONAL SYSTEM FOR A VEHICLE

(71) Applicant: Volvo Car Corporation, Gothenburg (SE)

(72) Inventors: Mats Bergström, Gothenburg (SE); John Fredriksson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 525 days.

(21) Appl. No.: 17/732,637

(22) Filed: Apr. 29, 2022

(65) Prior Publication Data

US 2023/0347916 A1  Nov. 2, 2023

(51) Int. Cl.
| | |
|---|---|
| *G06F 1/12* | (2006.01) |
| *B60W 50/08* | (2020.01) |
| *B60W 50/10* | (2012.01) |
| *B60W 50/00* | (2006.01) |

(52) U.S. Cl.
CPC .......... *B60W 50/085* (2013.01); *B60W 50/10* (2013.01); *G06F 1/12* (2013.01); *B60W 2050/0043* (2013.01)

(58) Field of Classification Search
CPC .............. B60W 50/085; B60W 50/10; B60W 2050/0043; G06F 1/12
See application file for complete search history.

(56) References Cited

U.S. PATENT DOCUMENTS

| | | | |
|---|---|---|---|
| 2004/0205368 A1* | 10/2004 | Lange-Pearson | G06F 1/14 713/400 |
| 2005/0086406 A1* | 4/2005 | Noha | G06F 1/04 713/400 |
| 2019/0229885 A1* | 7/2019 | Fukuda | H04L 7/0037 |
| 2021/0289328 A1* | 9/2021 | Yan | G04G 21/04 |
| 2022/0137995 A1* | 5/2022 | Kashtan | G06F 1/14 718/1 |

* cited by examiner

*Primary Examiner* — Gary Collins
(74) *Attorney, Agent, or Firm* — Clements Bernard Walker; Christopher L. Bernard

(57) ABSTRACT

A method for synchronizing a clock-free computational node in a vehicle such that the clock-free computational node is able to perform an action at a pre-defined time, including generating a mapping between at least one current counter value received from the clock-free computational node and at least one current time information received from a clock unit. Moreover, the method includes determining a pre-defined counter value being associated with the pre-defined time based on the mapping. Furthermore, the method includes providing the pre-defined counter value to the clock-free computational node. Additionally, a method for performing an action at a pre-defined time using a clock-free computational node is presented. The disclosure is directed to a corresponding first computational node including the clock unit and a second computational node being clock-free and a computational system for a vehicle.

15 Claims, 2 Drawing Sheets

METHOD FOR SYNCHRONIZING A CLOCK-FREE COMPUTATIONAL NODE IN A VEHICLE, METHOD FOR PERFORMING AN ACTION AT A PRE-DEFINED TIME, FIRST COMPUTATIONAL NODE, SECOND COMPUTATIONAL NODE AND COMPUTATIONAL SYSTEM FOR A VEHICLE

TECHNICAL FIELD

The present disclosure relates to a method for synchronizing a clock-free computational node in a vehicle such that the clock-free computational node is able to perform an action at a pre-defined time. The clock-free computational node includes a counter unit being configured for producing a sequence of counter values according to a pre-defined set of rules.

The present disclosure is also directed to a method for performing an action at a pre-defined time using a clock-free computational node.

Furthermore, the present disclosure relates to a first computational node including a clock unit and a second computational node being clock-free.

Moreover, the present disclosure relates to a computational system for a vehicle. The computational system includes a first computational node as mentioned above and at least one second computational node as mentioned above.

BACKGROUND

In computational systems of vehicles it may be important that the computational nodes of the system perform actions at a pre-defined time. This applies both with respect to a super-ordinate, general time and with respect to a relative time between a pair of nodes.

The computational nodes of such a computational system may for example be configured as sensor nodes or actuator nodes.

An example of such a computational system is an advanced driver assistance system of a vehicle.

If actions need to be performed at a pre-defined time, each node may be equipped with a clock unit such that a respective time information is available at each node.

However, this may conflict with the aim to enhance the computational efficiency and the structural simplicity of computational system for vehicles.

SUMMARY

It is therefore an objective of the present disclosure to provide a computational system for a vehicles which is structurally simple and computational efficient while at the same time the known functionality is not affected.

The problem is at least partially solved or alleviated by the subject matter of the present disclosure.

According to a first aspect, there is provided a method for synchronizing a clock-free computational node in a vehicle such that the clock-free computational node is able to perform an action at a pre-defined time. The clock-free computational node includes a counter unit being configured for producing a sequence of counter values according to a pre-defined set of rules. The method includes:
receiving at least one current counter value from the clock-free computational node,
receiving at least one current time information from a clock unit,
generating a mapping between the at least one current counter value and the at least one current time information,
determining a pre-defined counter value being associated with the pre-defined time based on the mapping, and
providing the pre-defined counter value to the clock-free computational node.

Thus, using this method, a computational node which is equipped with a counter unit only, can nevertheless perform an action at a pre-defined time. In other words, a clock-free computational node can be enabled to perform timely actions without needing a clock unit. It is understood that at the time at which the method is performed, both the pre-defined time and the pre-defined counter value lie in the future. Since a counter unit is simpler than a clock unit, the method provides a high overall computational efficiency. At the same time, using the method, a computational system can be rendered structurally simple since a reduced number of clock units is necessary. The functionality is not changed with respect to a computational node including a clock unit. A vehicle in which such a method is performed, thus, may be operated in a computationally efficient manner.

It is understood that receiving at least one current counter value also includes receiving a plurality of counter values. The plurality of counter values may be received over a certain time span.

Furthermore, it is understood that the at least one current time information may be received from a clock unit which forms part of the same computational node that performs the method. Alternatively, the current time information may be received from a clock unit being external to the computational node that performs the method. In the latter case, the clock unit needs to be communicatively connected to the computational node performing the method.

Analogously, receiving at least one current time information from a clock unit also includes receiving a plurality of time information. The plurality of time information may be received over a certain time span.

As far as the counter unit is concerned, a set of rules may include event-based rules such that a counter impulse or value is produced as a function of an event. Alternatively or additionally, the set of rules may be interval based, i.e. a counter impulse or value may be produced after a certain interval which is estimated without using a clock unit.

In the present disclosure, a counter value and a counter impulse are synonyms.

In an example, generating a mapping between the at least one current counter value and the at least one current time information may include determining a number of counter impulses or counter values that corresponds to a given time unit, e.g. 1 second or 1 minute.

In another example, generating a mapping between the at least one current counter value and the at least one current time information may include applying a pattern recognition technique on the at least one current counter value. In doing so, a time needed for one instance of the pattern is determined based on the received at least one time information. Consequently, the time information can be mapped on the counter impulse pattern and also on each counter impulse or counter value of the pattern.

In an example, the method may be implemented as a protocol. This is a very simple and computationally efficient way of implementation.

In an example, the method further includes receiving or generating an action identifier describing the action to be performed. Thus, the clock-free computational node can additionally be provided with an action identifier. This means that the clock-free computational node does not need to identify the action to be performed. Consequently, the clock-free computational node can be designed in a lean and simple manner.

In an example, the identifier describing an action to be performed may be provided by a library which additionally includes further attributes of the action to be performed.

In an example, the method further includes requesting the clock-free computational node to reset the counter unit. In doing so, one can make sure that the clock-free computational node operates at a well-defined and known condition at the moment of resetting the counter. When subsequently generating a mapping between the at least one current counter value and the at least one current time information, the accuracy of the mapping is increased. An example of resetting the counter is setting the counter to zero.

In an example, the method further includes storing the received at least one current counter value. Thus, a history of counter values is generated. A time information may be attributed to each of the historic counter values. The stored counter values may be used for generating the mapping between the at least one current counter value and the at least one current time information. This further increases the accuracy of the mapping.

In an example, the method further includes requesting the at least one current counter value from the clock-free computational node and determining a response time between requesting and receiving of the at least one current counter value from the clock-free computational node. The response time is an indication of the time delay caused by a data connection towards the clock-free computational node. Knowing the time delay is a basis for providing an accurate mapping between the at least one current counter value and the at least one current time information.

In an example, generating the mapping between the at least one current counter value and the at least one current time information incorporates the determined response time. In other words, a signal transportation time is considered in the mapping. Thus, an accuracy of the mapping is increased.

According to a second aspect, there is provided a method for performing an action at a pre-defined time using a clock-free computational node. The clock-free computational node includes a counter unit being configured for producing a sequence of counter values according to a pre-defined set of rules. The method includes:
 receiving a pre-defined counter value being associated with the pre-defined time,
 comparing the pre-defined counter value to a current counter value, and
 performing the action if the current counter value equals or exceeds the pre-defined counter value.

Thus, the clock-free computational node performs the action as a function of a counter value. This is structurally and computationally efficient. At the same time, the pre-defined counter value corresponds to a pre-defined time. Thus, the action is performed at a pre-defined time. It is understood that at the time at which the pre-defined counter value is received, both the pre-defined time and the pre-defined counter value lie in the future. Consequently, the clock-free computational node can perform an action in a timely manner which usually is only possible using a computational node including a clock unit.

It is understood that in a case in which the current counter value is inferior to the pre-defined counter value no action is performed.

In an example, the method further includes receiving an action identifier describing the action to be performed and performing the action corresponding to the action identifier. Thus, the clock-free computational node does not need to determine the action to be performed. The clock-free computational node can thus be designed in a lean and simple manner.

In an example, the method further includes receiving a reset request and resetting the counter unit. Thus, the counter unit of the clock-free node can be put into a well-defined state upon request. Consequently, an accuracy of a mapping between the at least one current counter value and the at least one current time information is increased.

According to a third aspect, there is provided a first computational node including a clock unit and means for carrying out the method according to the present disclosure for synchronizing a clock-free computational node in a vehicle. Thus, such a first computational node is configured to trigger and/or control timely actions at at least one clock-free computational node. Moreover, such a first computational node is configured to trigger and/or control a plurality of actions at a plurality of clock-free computational nodes, wherein the actions are performed in a timely organized manner. The actions may also be performed in parallel, i.e. simultaneously.

It is understood that the designation of the computational node as a first computational node is done for the ease of explanation only and does not imply any number of computational nodes.

In the present context, a clock unit is to be understood as a device which is configured to provide a signal describing a time. The clock unit may include a quartz clock unit.

In an example, the first computational node is a central control node. Thus, the first computational node is configured to control actions being performed by other nodes being included by the same computational system or a different computational system.

In an example, the first computational node includes a driver assistance control unit of a vehicle. Thus, the first computational node forms part of an advanced driver assistance system. Thus, the first computational node may be configured to perform or control at least one sensing action of an advanced driver assistance system. Alternatively or additionally, the first computational node may be configured to perform or control at least one actuation action of an advanced driver assistance system.

According to a fourth aspect, there is provided a second computational node being clock-free. The second computational node includes a counter unit being configured for producing a sequence of counter values according to a pre-defined set of rules and means for carrying out the method according to the present disclosure for performing an action at a pre-defined time using a clock-free computational node. Such a second computational node is comparatively simple and may be operated in a comparatively efficient manner. The second computational node may perform actions in a manner usually reserved to computational nodes including a clock unit. Thus, a computational system can be simplified by using second computational nodes according to the present disclosure instead of known computational nodes including a clock unit. It is noted that such a second computational node can provide its functionalities with minimal computing capabilities.

It is understood that the designation of the computational node as a second computational node is done for the ease of explanation only and does not imply any number of computational nodes.

In an example, the second computational node includes a sensor unit being configured to detect a drive state value describing a current drive state of a vehicle. Thus, the second computational node forms part of an advanced driver assistance systems. The drive state value can be detected in a simple and efficient manner. The detected drive state can provided in a timely and synchronized manner.

It is noted that, of course, a plurality of second computational nodes can be provided wherein each second computational node includes a sensor unit. The detection results of such sensor units can as well be provided in a timely, synchronized manner.

In an example, the second computational node includes an actuator unit being configured to influence a drive state of a vehicle. Again, the second computational node may form part of an advanced driver assistance systems. The actuator unit can be operated in a simple and efficient manner. Additionally, the actuator unit may be operated in a timely and synchronized manner.

In an example, the actuator unit is a drive motor unit, a steering actuator unit or a brake actuator unit. Thus, using the actuator unit, driving maneuvers such as autonomous driving maneuvers may be performed.

According to a fifth aspect, there is provided a computational system for a vehicle. The computational system includes a first computational node according to the present disclosure and at least one second computational node according to the present disclosure. The first computational node is communicatively connected to each of the at least one second computational nodes. Such a computational system is simple in design and may be operated in a computationally efficient manner. This is especially the case if the number of first computational nodes is small as compared to the total number of computational nodes.

In an example, the computational system is a driver assistance control system of a vehicle.

In an example, the communicative connection is realized via a wired or wireless network. The communicative connection can be at least one of an Ethernet connection and a bus system connection, e.g. CAN bus.

It is noted that in a case in which the computational system includes two or more second computational nodes, the first computational node can trigger and/or control a plurality of concurrent actions at the different second computational nodes. The actions may be performed in a timely organized and synchronized manner. The actions may also be performed in parallel.

The methods according to the present disclosure may be at least partly computer-implemented, and may be implemented in software or in hardware, or in software and hardware. Further, the methods may be carried out by computer program instructions respectively running on means that provide data processing functions. The data processing means may be a suitable computing means, such as an electronic control module etc., which may also be a distributed computer system. The data processing means or the computer, respectively, may include one or more of a processor, a memory, a data interface, or the like.

According to an example, there is provided a computer program including instructions which, when the computer program is executed by a computer, cause the computer to carry out the method for synchronizing a clock-free computational node in a vehicle. In this context, a computational node is to be seen as a computer.

According to an example, there is provided a computer-readable storage medium including instructions which, when executed by a computer, cause the computer to carry out the method for synchronizing a clock-free computational node in a vehicle. Again, a computational node is to be seen as a computer. The computer-readable storage medium may form part of the computational node.

According to an example, there is provided a computer program including instructions which, when the computer program is executed by a computer, cause the computer to carry out the method for performing an action at a pre-defined time using a clock-free computational node. In this context, a computational node is to be seen as a computer.

According to an example, there is provided a computer-readable storage medium including instructions which, when executed by a computer, cause the computer to carry out the method for performing an action at a pre-defined time using a clock-free computational node. Again, a computational node is to be seen as a computer. The computer-readable storage medium may form part of the computational node.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
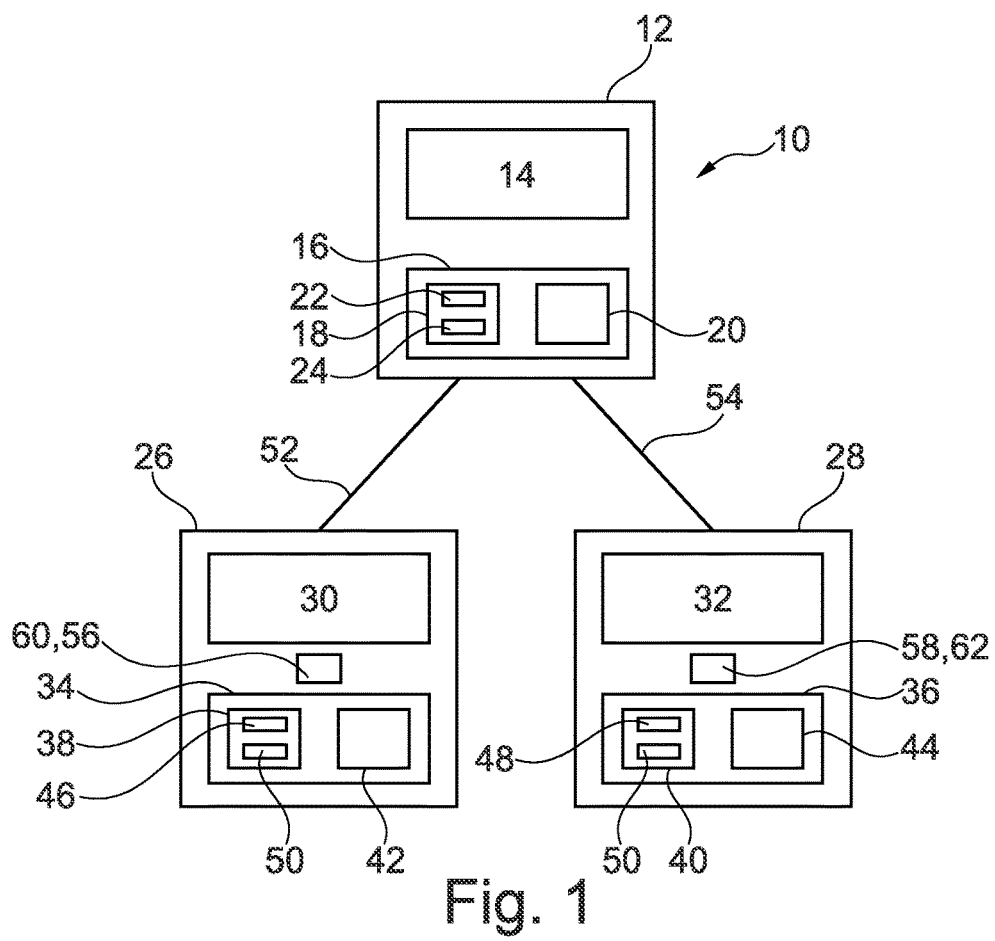
FIG. 1 shows a computational system according to the present disclosure including one first computational node according to the present disclosure and two second computational nodes according to the present disclosure, wherein the first computational node and the second computational nodes are respectively configured to perform one of the methods according to the present disclosure.

FIG. 1 shows a computational system 10 of a vehicle.

The computational system 10 includes one first computational node 12.

The first computational node 12 includes a clock unit 14. Thus, in simplified words, the first computational node 12 has a perception of time.

Additionally, the first computational node 12 includes means 16 for carrying out a method for synchronizing a clock-free computational node in the vehicle such that the clock-free computational node is able to perform an action at a pre-defined time. The method will be explained in detail further below.

The means 16 include a data storage unit 18 and a data processing unit 20, wherein the data storage unit 18 includes a computer-readable storage medium 22 including instructions which, when executed by the data processing unit 20, cause the data processing unit 20 to carry out the method for synchronizing a clock-free computational node in the vehicle.

Additionally, there is provided a computer program 24 on the data storage unit 18 including instructions which, when the program is executed by the data processing unit 20, cause the data processing unit 20 to carry out the method for synchronizing a clock-free computational node in the vehicle.

The computational system 10 also includes two second computational nodes 26, 28.

Both second computational nodes 26, 28 are clock-free. Thus, in simplified words, the second computational nodes 26, 28 do not have a perception of time.

However, each of the second computational nodes 26, 28 includes a counter unit 30, 32.

Each of the counter units 30, 32 is configured for producing a sequence of counter values or impulses according to a pre-defined set of rules.

Moreover, each of the second computational nodes 26, 28 includes means 34, 36 for carrying out a method for performing an action at a pre-defined time using a clock-free computational node. The method will be explained in detail further below.

The means 34, 36 each include a data storage unit 38, 40 and a data processing unit 42, 44, wherein the data storage units 38, 40 each include a computer-readable storage medium 46, 48 including instructions which, when executed by the respective data processing unit 42, 44, cause the data processing unit 42, 44 to carry out the method for performing an action at a pre-defined time.

Additionally, there is provided a computer program 50 on each of the data storage units 38, 40 including instructions which, when the computer program 50 is executed by the respective data processing unit 42, 44, cause the data processing unit 42, 44 to carry out the method for performing an action at a pre-defined time.

Since the computer program 50 is the same for both second computational nodes 26, 28, it is designated with the same reference sign.

The first computational node 12 is communicatively connected to the second computational node 26 via a first data connection 52.

Moreover, the first computational node 12 is communicatively connected to the second computational node 28 via a second data connection 54.

The data connections 52, 54 are bidirectional.

In the present example, the data connections are realized via a bus connection or a network connection.

In the following, an operation of the computational system 10 is described.

Figure 3:
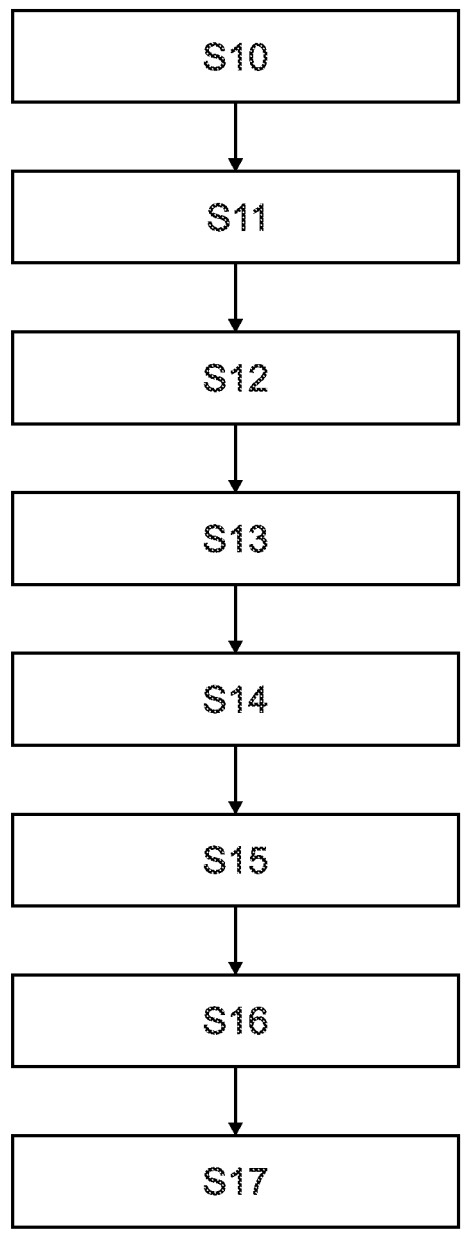
FIG. 3 illustrates steps of a method according to the present disclosure for synchronizing a clock-free computational node in a vehicle.

It is noted that on the first computational node 12, a method for synchronizing a clock-free computational node, in the present example the second computational nodes 26, 28, in the vehicle is performed (cf. FIG. 3).

Figure 2:
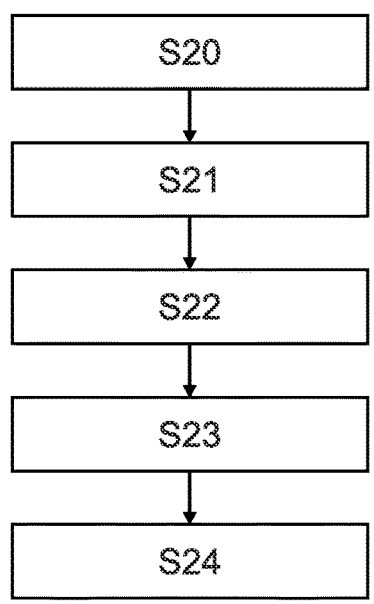
FIG. 2 illustrates steps of a method according to the present disclosure for performing an action at a pre-defined time using a clock-free computational node.

On each of the second computational nodes 26, 28, a method for performing an action at a pre-defined time using a clock-free computational node is performed (cf. FIG. 2).

It is noted that in the following, a method step being performed by the first computational node 12 is to be understood as a synonym to the performance of a step of the method for synchronizing a clock-free computational node.

Analogously, a method step being performed by one of the second computational nodes 26, 28 is to be understood as a synonym to the performance of a step of the method for performing an action at a pre-defined time.

Since the first computational node 12 and the second computational nodes 26, 28 interact with each other, both methods will be explained together.

In order to have both counter units 30, 32 in a known state, both second computational nodes 26, 28 are requested to reset the respective counter unit 30, 32 by the first computational node 12.

Thus, the first computational node 12 sends a corresponding request in a step S10 of the method for synchronizing a clock-free computational node.

Both second computational nodes 26, 28 receive the reset request and reset the respective counter unit 30, 32 to zero in a step S20 of the method for performing an action at a pre-defined time.

Subsequently, in a step S11, the first computational node 12 requests a current counter value from each of the clock-free, second computational nodes 26, 28.

Both second computational nodes 26, 28 answer by sending a corresponding current counter value to the first computational node 12 in a step S21.

These current counter values are received by the first computational node in a step S12.

Moreover, the first computational node 12 receives a current time information from its clock unit 14 in a step S13.

Moreover, in a step S14, the first computational node determines a response time for each of the second computational nodes 26, 28.

The response time is the time span between requesting and receiving of the current counter value from the respective clock-free second computational node 26, 28.

The response time is indicative of a time delay being caused by the first data connection 52 and the second data connection 54 respectively.

Based on the received current counter values, the determined response times and the received time information, the first computational unit 12 generates a mapping between the current counter values and the time information in a step S15.

In the present example, the counter units 30, 32 are configured for providing a counter impulse after a pre-defined interval respectively. However, since the second computational nodes 26, 28 do not include a clock unit, this interval is subject to inaccuracies.

Thus, the mapping essentially includes determining a number of counter impulses which corresponds to a given time unit, e.g. 1 second or 1 minute. Moreover, the determined response time is incorporated, i.e. a shift corresponding to the response time is generated between the current counter values and the time information.

Based on this, the first computational node 12 determines a pre-defined counter value being associated with the pre-defined time based on the mapping in a step S16. At the time when step S16 is executed, both the pre-defined counter value and the pre-defined time lie in the future.

At the pre-defined time both second computational nodes shall perform an action which is determined by the first computational node 12.

The action is described by an action identifier.

Consequently, in a step S17 a pre-defined counter value is provided to each of the clock-free second computational nodes 26, 28.

Moreover, also in step S17 the corresponding identifier is provided to each of the clock-free second computational nodes 26, 28.

Both second computational nodes 26, 28 receive the corresponding pre-defined counter value being associated with the pre-defined time in a step S22. Also the identifier describing the action to be performed is received.

Subsequently, each of the second computational nodes 26, 28 periodically compares the pre-defined counter value to a current counter value in a step S23.

If it is determined by any one of the second computational nodes 26, 28 that the current counter value equals or exceeds the pre-defined counter value, the action corresponding to the action identifier is performed by each of the second computational nodes 26, 28 in a step S24.

Optionally, the method for synchronizing a clock-free computational node in a vehicle further includes storing all received current counter values and attribute a current time information to the received counter values. Thus, a history of counter values is stored. This history can be used when generating the mapping. For example, historic average values may be calculated based on the history.

In the following two use cases of the computational system 10 will be explained.

In the first use case, the first computational node 12 is a driver assistance control unit of the vehicle.

The second computational nodes 26, 28 each include a sensor unit 56, 58. Thus, the second computational nodes 26, 28 may also be designated as sensor nodes.

Both sensor units 56, 58 are configured to detect a drive state value describing a current drive state of a vehicle.

In the present use case, the sensor unit 56 is configured to detect a rotational speed of a driven wheel of the vehicle and the sensor unit 58 is configured to detect a longitudinal acceleration of the vehicle.

The action to be performed by the second computational nodes 26, 28 is to provide a detection result.

In the present use case, the detection results from the sensor units 56, 58 need to be provided at the same pre-defined time. Otherwise, the first computational node 12 being the driver assistance control unit is not able to derive useful information from the combination of the detection results.

If, for example, at the pre-defined time the sensor unit 56 provides a detection result describing a rotational speed of substantially zero and the sensor unit 58 provides a detection result describing a longitudinal acceleration exceeding zero, one may conclude that the vehicle is sliding. As a consequence thereof, the first computational node 12 being the driver assistance control unit can trigger an actuation of the brakes of the remaining wheels and/or issue a warning.

In another example, at the pre-defined time, the sensor unit 56 provides a detection result describing a rotational speed exceeding zero and the sensor unit 58 provides a detection result describing a longitudinal acceleration exceeding zero. Both detection results refer to the same orientation. Moreover, a temporal differential of the rotational speed can be calculated. Using a look up table, the first computational node 12 being the driver assistance control unit can find that the acceleration matches the temporal differential of the rotational speed. Thus, the first computational node 12 can conclude that the vehicle is perfectly under control and no further driver assistance action is necessary.

In a second use case, the first computational node 12, again, is a driver assistance control unit of the vehicle.

The second computational nodes 26, 28 each include an actuator unit 60, 62. Thus, the second computational nodes 26, 28 may also be designated as actuator nodes.

For the ease of representation, the actuator units 60, 62 are represented by the same elements of FIG. 1 as the sensor units 56, 58. However, in reality, the actuator units 60, 62 and the sensor units 56, 58 obviously are different entities.

Both actuator units 60, 62 are configured to influence a drive state of the vehicle.

More precisely, in the present use case, the actuator unit 60 is a steering actuator of the vehicle and the actuator unit 62 is a brake actuator.

Moreover, the present use case is directed to an autonomous parking manoeuver which is controlled by the first computational node 12 being the driver assistance control unit. In this use case, a driver is responsible for accelerating the vehicle by operating the accelerator pedal. Steering and braking is performed autonomously.

It is easily understandable that in this use case, a steering action which is performed by the actuator unit 60 and a braking action which is performed by the actuator unit 62 need to be timely synchronized in order to successfully perform the parking maneuver.

It is understood, that, of course, further use cases are possible. Moreover, the use cases may be mixed.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A method for synchronizing a second, clock-free computational node in a vehicle using a first computational node such that the second, clock-free computational node is able to perform an action at a pre-defined time, wherein the second, clock-free computational node comprises a counter unit being configured for producing a sequence of counter values according to a pre-defined set of rules and wherein the first computational node comprises a clock unit, the method comprising:
   receiving, by the first computational node, at least one current counter value from the second, clock-free computational node at the first computational node,
   receiving, by the first computational node, at least one current time information from the clock unit of the first computational node,
   generating, by the first computational node, a mapping between the at least one current counter value and the at least one current time information,
   determining, by the first computational node, a pre-defined counter value being associated with the pre-defined time based on the mapping, and
   providing, by the first computational node, the pre-defined counter value to the second, clock-free computational node.

2. The method of claim 1, further comprising receiving or generating, by the first computational node, an action identifier describing the action to be performed.

3. The method of claim 1, further comprising requesting, by the first computational node, the second, clock-free computational node to reset the counter unit.

4. The method of claim 1, further comprising storing, by the first computational node, the received at least one current counter value.

5. The method of claim 1, further comprising:
requesting, by the first computational node, the at least one current counter value from the second, clock-free computational node, and
determining, by the first computational node, a response time between requesting and receiving of the at least one current counter value from the second, clock-free computational node.

6. The method of claim 5, wherein generating the mapping between the at least one current counter value and the at least one current time information incorporates the determined response time.

7. A method for performing an action at a pre-defined time using a second, clock-free computational node, wherein the second, clock-free computational node comprises a counter unit being configured for producing a sequence of counter values according to a pre-defined set of rules, the method comprising:
receiving, by the second, clock-free computational node, a pre-defined counter value being associated with the pre-defined time from a first computational node, wherein the first computational node comprises a clock unit,
comparing, by the second, clock-free computational node, the pre-defined counter value to a current counter value, and
performing, by the second, clock-free computational node, the action if the current counter value equals or exceeds the pre-defined counter value.

8. The method of claim 7, further comprising receiving, by the second, clock-free computational node, an action identifier describing the action to be performed and performing, by the second, clock-free computational node, the action corresponding to the action identifier.

9. The method of claim 7, further comprising receiving, by the second, clock-free computational node, a reset request and resetting the counter unit.

10. A first computational node comprising a clock unit and means for carrying out the method of claim 1.

11. The first computational node of claim 10, wherein the first computational node comprises a driver assistance control unit of a vehicle.

12. A second, clock-free computational node, the second, clock-free computational node comprising a counter unit being configured for producing a sequence of counter values according to a pre-defined set of rules and means for carrying out the method of claim 7.

13. The second computational node of claim 12, wherein the second computational node comprises a sensor unit being configured to detect a drive state value describing a current drive state of a vehicle.

14. The second computational node of claim 12, wherein the second computational node comprises an actuator unit being configured to influence a drive state of a vehicle.

15. A computational system for a vehicle, comprising:
a first computational node comprising a clock unit and means for carrying out a method for synchronizing a second, clock-free computational node in a vehicle using the first computational node such that the second, clock-free computational node is able to perform an action at a pre-defined time, wherein the second, clock-free computational node comprises a counter unit being configured for producing a sequence of counter values according to a pre-defined set of rules and wherein the first computational node comprises a clock unit, the method comprising:
receiving, by the first computational node, at least one current counter value from the second, clock-free computational node at the first computational node,
receiving, by the first computational node, at least one current time information from the clock unit of the first computational node,
generating, by the first computational node, a mapping between the at least one current counter value and the at least one current time information,
determining, by the first computational node, a pre-defined counter value being associated with the pre-defined time based on the mapping, and
providing, by the first computational node, the pre-defined counter value to the second, clock-free computational node, and
at least the second, clock-free computational node of claim 12, wherein the first computational node is communicatively connected to the at least the second, clock-free computational node.

* * * * *